(12) United States Patent
Lauri et al.

(10) Patent No.: US 8,492,446 B2
(45) Date of Patent: Jul. 23, 2013

(54) ENHANCED PROCESS FOR THE PRODUCTION OF EXPANDED PVC AND PLASTIC MATERIALS BASED ON EXPANDED PVC OBTAINED THEREWITH

(75) Inventors: Leone Lauri, Belluno (IT); Eva-Lotta Magdalena Petersson, Bastad (SE); Raffaela Bressan, Oderzo-Treviso (IT); Samia Mariam Hamed, Austin, TX (US)

(73) Assignee: Diab International AB, Laholm (SE)

( * ) Notice: Subject to any disclaimer, the term of this patent is extended or adjusted under 35 U.S.C. 154(b) by 0 days.

(21) Appl. No.: 13/697,516

(22) PCT Filed: Jun. 7, 2011

(86) PCT No.: PCT/EP2011/002898
§ 371 (c)(1),
(2), (4) Date: Nov. 12, 2012

(87) PCT Pub. No.: WO2011/154161
PCT Pub. Date: Dec. 15, 2011

(65) Prior Publication Data
US 2013/0150474 A1    Jun. 13, 2013

(30) Foreign Application Priority Data

Jun. 11, 2010  (IT) .............................. MI2010A1058
May 27, 2011  (IT) .............................. MI2011A0961

(51) Int. Cl.
*C08J 9/32*   (2006.01)
*B29C 44/02*  (2006.01)

(52) U.S. Cl.
USPC .................. 521/82; 521/145; 264/51; 264/54

(58) Field of Classification Search
USPC .................................. 521/82, 145; 264/51, 54
See application file for complete search history.

(56) References Cited

U.S. PATENT DOCUMENTS

| | | | |
|---|---|---|---|
| 5,272,001 A | 12/1993 | Weisman | |
| 5,629,364 A * | 5/1997 | Malmbom et al. | ............. 523/219 |
| 6,248,799 B1 * | 6/2001 | Peretti et al. | .................... 521/54 |
| 2005/0221073 A1 * | 10/2005 | Liou | ......................... 428/304.4 |

FOREIGN PATENT DOCUMENTS

| | | |
|---|---|---|
| EP | 0029021 | 5/1981 |
| EP | 0695626 | 2/1996 |
| EP | 1908576 | 4/2008 |
| EP | 2039496 | 3/2009 |

* cited by examiner

*Primary Examiner* — Irina S Zemel
(74) *Attorney, Agent, or Firm* — Themis Law

(57) ABSTRACT

A process for the production of expanded PVC of the type includes heating a mass of polymeric mixture inside a closed mold; controlling the expansion of the mass in an environment having a constant volume defined by the closed mold, control being performed by the presence, in the mass of polymeric mixture, of microparticles of a compressible material, suitable for being contracted, under the action of the pressure generated by the formation and expansion of microcells of expanding gas in the same mass, from an initial form having a larger volume, to a form having a smaller volume; and expanding the microparticles, from their configuration to the initial configuration, the density of the expanded material thus obtained being determined by the contemporary presence of both microcells of expanding gas and the microparticles in their configuration having a larger volume.

9 Claims, 4 Drawing Sheets

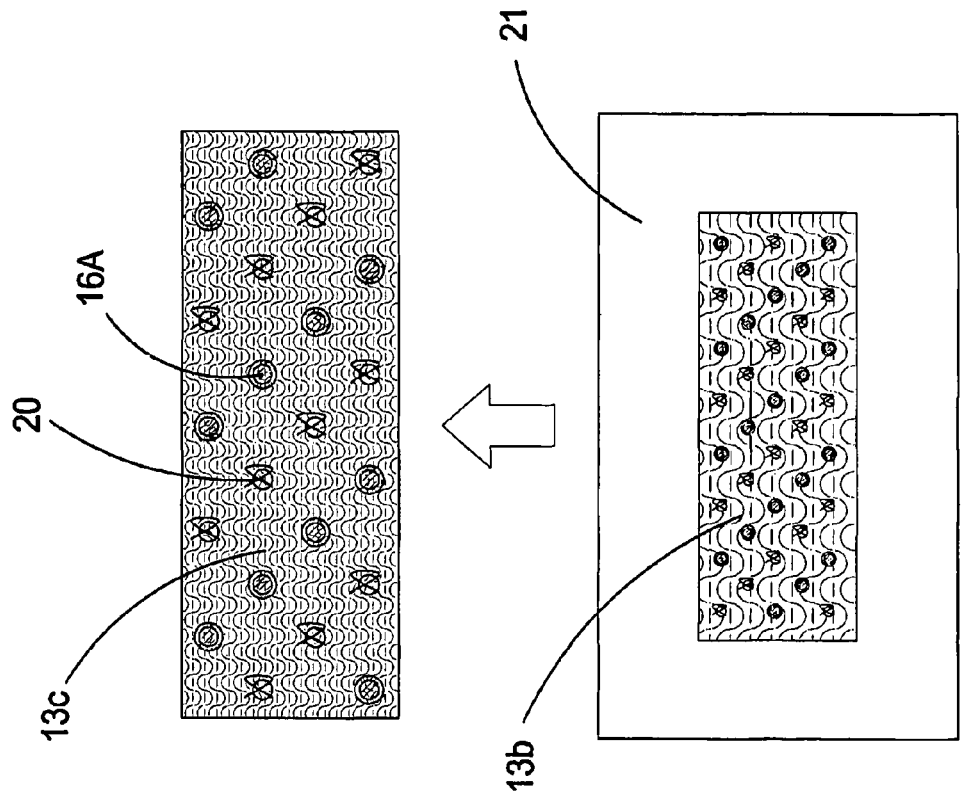
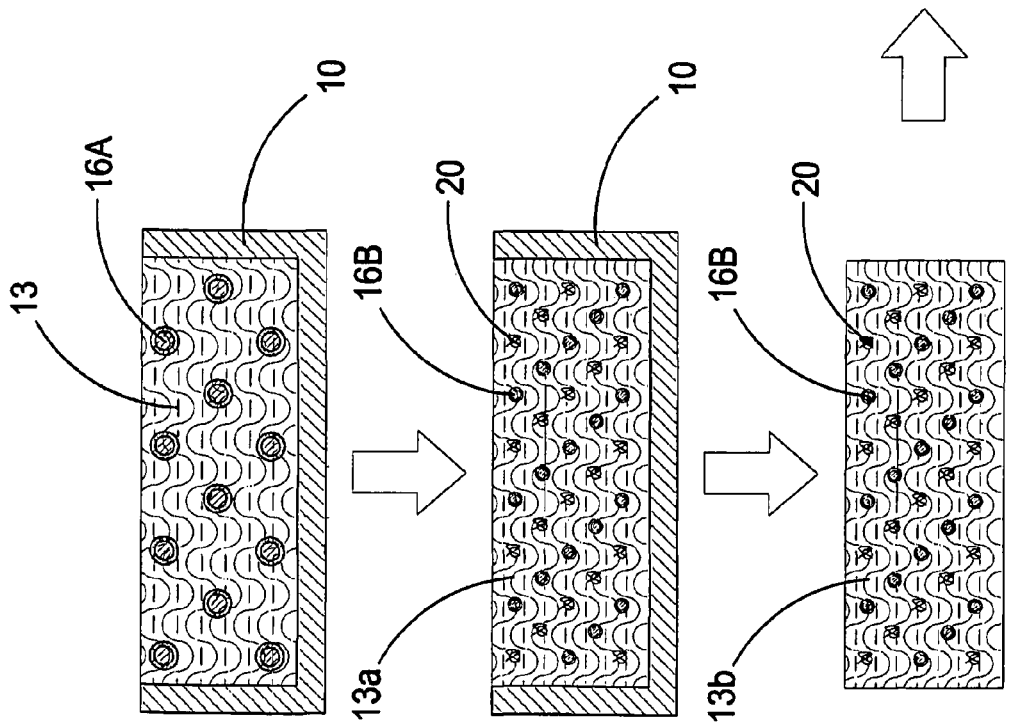
Fig. 4

ENHANCED PROCESS FOR THE PRODUCTION OF EXPANDED PVC AND PLASTIC MATERIALS BASED ON EXPANDED PVC OBTAINED THEREWITH

FIELD OF THE INVENTION

The present invention relates to an enhanced process for the production of expanded PVC, in particular IPN (Inter Penetrating Network) polymeric foams consisting of polyamide, polyimide, polyvinylchloride, polyisocyanurate and polyurea.

The invention is also extended to plastic materials based on expanded PVC obtained by means of this process.

The field of the invention is that of processes used for preparing expanded PVC which comprise heating a starting mixture in a mold having a constant volume, closed by a lid, and the subsequent expansion of the obtained embryo.

BACKGROUND OF THE INVENTION

In particular, in the field of the production of IPN polymeric foams consisting of polyamide-polyimide-polyvinylchloride-polyisocyanurate-polyurea (see description of the IPN concept in "Interpenetrating Polymer Networks", D. Klempner, L. H. Sperling, L. A. Utracki; vol. 239; American Chemical Society; Ed. 1994), the initial mixture of polymers, surfactants, chemical blowing agents, isocyanates, etc., is introduced into the mold. Once the mold has been closed by means of a suitable lid, the mixture is heated, thus causing the generation of blowing gas, the gelation of the polymer and the desired cross-linking reactions, with the incorporation of the gas inside the molecules of cross-linked IPN thus obtained. This part of the process is, in particular, performed in a closed mold and at a constant reaction volume, the pressure inside the mold being generated by the formation of gas and by the thermal expansion.

The known art described herein, however, has the drawback that, due to the expansion induced by the formation of blowing gas and by the heating of the plastic material, the mass of molten polymer and reagents tends to expand, in contrast with the action exerted by the lid which closes the mold. This compressed molten mass therefore tends to expand, leaking through the closed areas of the lid on the mold. Consequently, in traditional production processes which follow this molding technique, considerable quantities of waste material are formed, which are responsible for an undesired increase in the general production costs, in addition to maintenance problems relating to the machine and the environmental impact.

In addition to these disadvantages, there is also the degradation of the microcellular structure of the finished product, particularly in correspondence with the leakage of plastic material from the mold.

A further drawback of the present methods for the production of expanded PVC lies in the high amounts of chemical blowing agents used, which, in addition to being harmful for the environment, are also expensive due to the complexity of the production, transportation and storage of these products.

Publication EP 2039496 A1 discloses a process for the production of rubber, using microspheres suitable for being crushed under the action of the volume increase of the starting mixture inside the vulcanization mold. According to this known technique, which does not relate to the field of expanded plastic materials, the molded product incorporates the microspheres in their final and definitive crushed or collapsed state, which is that of the final product based on rubber.

SUMMARY OF THE INVENTION

A main objective of the present invention is therefore to provide a new process for the production of expanded PVC, in particular IPN polymeric foams wherein, in addition to avoiding losses of molten product during the molding process, an expanded PVC, having the desired density value, can be obtained, even with much lower quantities of chemical blowing agents than those used in the known art.

A further objective of the invention is to provide a process of the above mentionedtype, which can considerably reduce product waste at the outlet of the molding phase, thus minimizing both the overall plant management costs and the environmental impact of the production of plastic material.

The invention also has the objective of contributing to enhancing the quality of the final product, by avoiding strong degradation of the microcellular structure of plastic material in correspondence with the mold closing areas.

These and other objectives are achieved with the process, the polymeric mixture and expanded plastic material of as described herein.

With respect to the known technology for the production of expanded plastic materials, a process according to the invention not only avoids the loss of molten product during the molding process, but also allows an expanded PVC having the desired density value to be obtained, even using a much lower quantity of chemical blowing agents with respect to those used in current processes of this type.

In particular, thanks to the significant reduction in the amount of chemical blowing agents used in a process according to the invention, the latter not only reduces the environmental damage caused by these products, but also the production costs of the expanded plastic material on which the production, transportation and storage costs of the chemical blowing agents have a considerable impact.

A further advantage of the invention is represented by the enhanced quality of the plastic material obtained due to the substantial absence of degradation in the microcellular structure, also of material formed in correspondence with the closing of the mold.

A process according to the invention also offers the advantage that, thanks to the volumetric compensation induced by the temporary contraction of the microparticles inside the compressed polymer mass, the process can be carried out at pressures lower than the normal values used with the mold, with consequent advantages also with respect to the operating conditions of themold.

Furthermore, thanks to the substantial absence of losses of plastic material from the mold, both the recovery and disposal costs of the waste products and the effect of the waste product on the environment, are greatly reduced.

BRIEF DESCRIPTION OF THE DRAWINGS

These and other objectives, advantages and characteristics are evident from the following description of a preferred embodiment of a process and an expanded plastic material according to the invention, shown, for illustrative and non-limiting purposes, in the figures of the enclosed drawings, in which:

FIG. 4 illustrates a schematic view of a process according to the invention.

DETAILED DESCRIPTION OF EMBODIMENTS OF THE INVENTION

Figure 1:
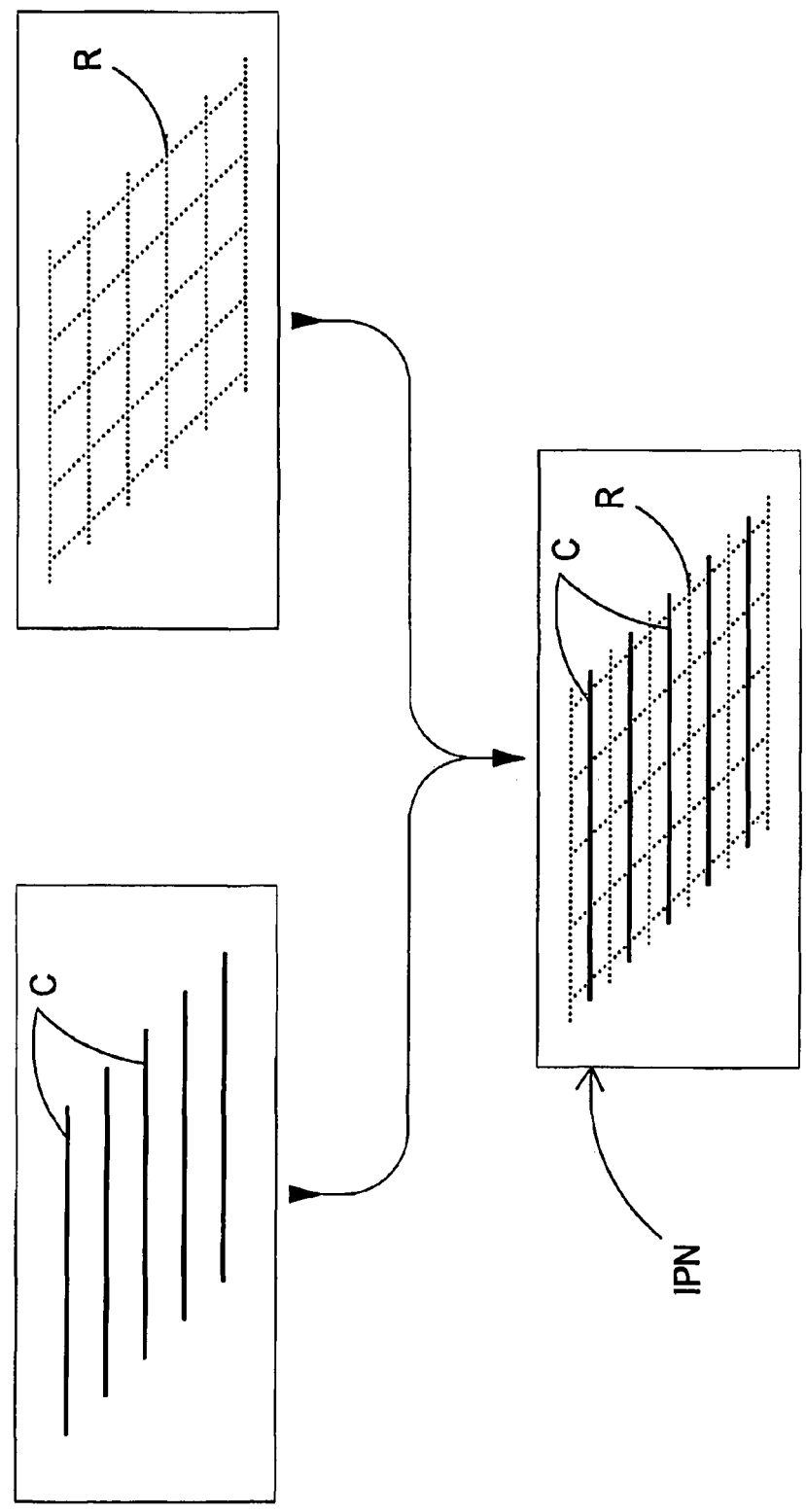
FIG. 1 schematically illustrates the structure of a polymeric IPN foam.

The polymeric IPN foam produced with a process according to the invention, as shown in FIG. 1 above, is obtained by the penetration of the linear chains C of PVC with a reticular structure R of polyamide, polyimide, polyisocyanurate and polyurea.

Figure 2:
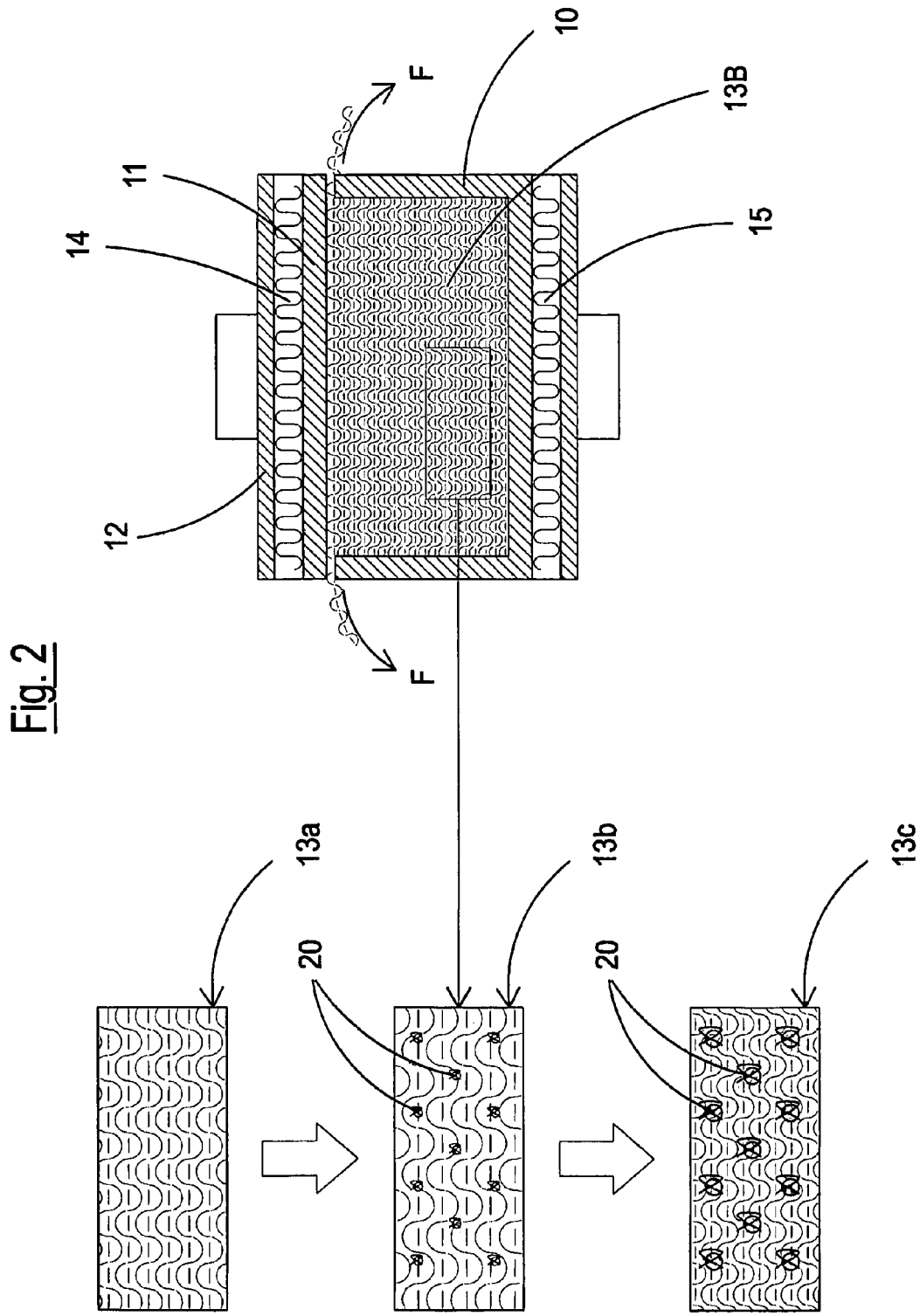
FIG. 2 illustrates a scheme of a processing example in a closed mold, of an expanded plastic material according to the known art.

According to the process of the known art illustrated in FIG. 2, a mass of starting polymeric mixture 13a (PVC resin, anhydride, isocyanates, chemical blowing agents, surfactants and catalyst) is injected into a mold 10, closed by a lid 11 activated by a press plate 12. Said mixture, when subjected to heating by the heating plates 14, 15 and compressed as a result of the contrast action exerted by the plate 12 against the expansion caused by the process reactions (in particular by the formation of microcells 20 of blowing gas) tends to expand energetically, until it overcomes the closing action of the lid 11 on the body of the mold 10. As a consequence, part of the polymeric material forming the mass 13b of molded product, tends to exit in correspondence with the closing rebates of the lid 11 on the body of the mold 10 (arrows F of FIG. 2).

The final product 13c, in turn, has the density conferred by the sole microcells 20 of blowing gas, which must consequently be present in the mass 13a of the starting mixture, in the high dosages necessary for this purpose.

According to the invention, in order to avoid the described loss of polymeric mixture from the mold 10, and to significantly reduce the quantities of chemical blowing agents used for generating the mentioned microcells of gas 20 inside the mass of expanded polymer, hollow microparticles 16 are added to the starting mixture, together with material elastically or reversibly compressible under process conditions. In the example illustrated in FIG. 3, these microparticles consist of microspheres formed by an outer casing 17 of a material elastically deformable under the process conditions, preferably polyacrylonitrile (PAN) or polymethacrylonitrile (PMAN), inside which a cavity 19 filled with a gas 18 (preferably isopentane), is defined. The use of the described elastically deformable materials forming the microparticles 16 has the particular advantage of making them reversibly compressible, so as to allow them to return to their initial configuration, once the hot molding process of the starting polymeric mixture has been completed. In this way, the microparticles 16 help in increasing, in their expanded or highest volume conformation, inside the expanded plastic material, both the density and the mechanical characteristics of the final manufactured product.

Figure 3:
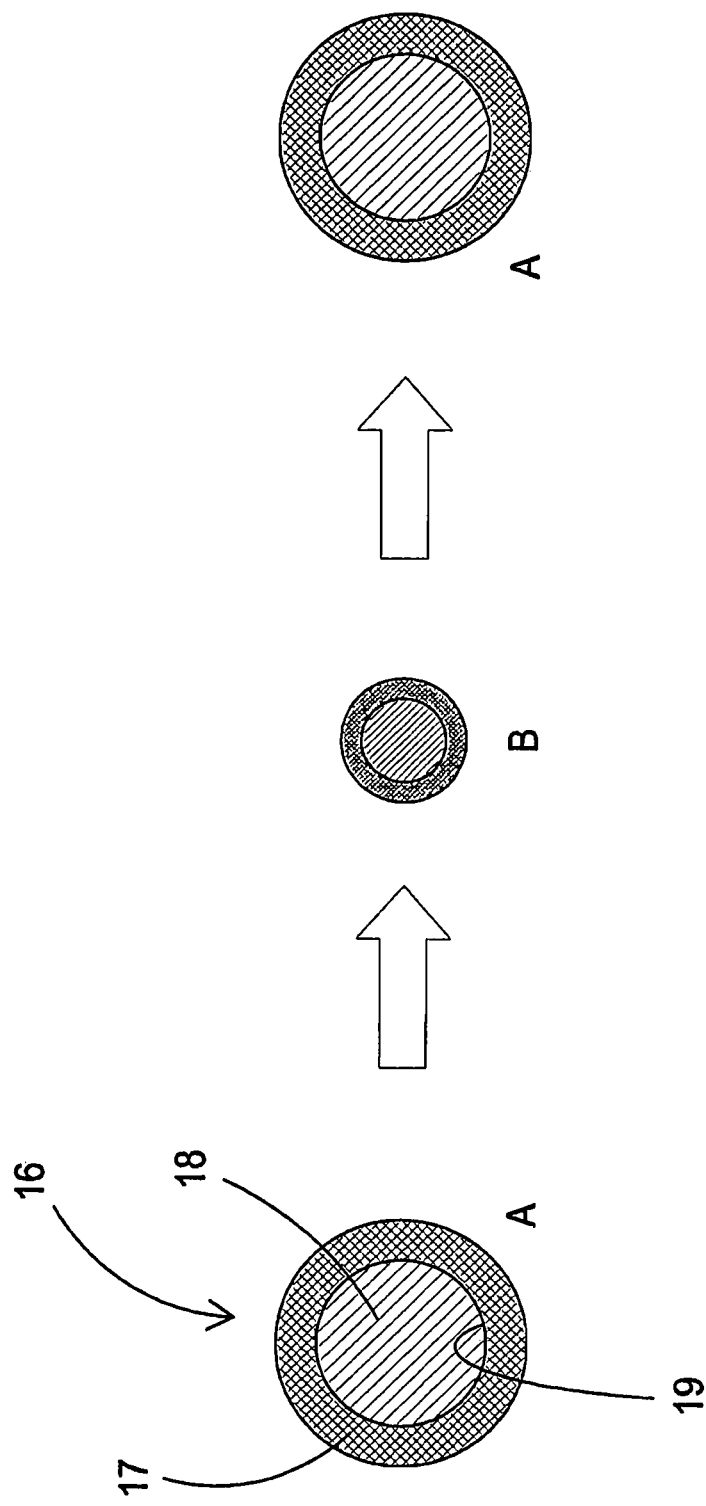
FIG. 3 illustrates the detail of an example of a microparticle of compressible material as used in a process according to the invention.

Thanks to the elastically deformable nature of the outer casing 17 and to the intrinsic compressibility of the gas 18 collected in the cavity 19 of the microparticles 16, the above microparticles 16 can be temporarily contracted, under the action of an external pressure, from the initial form A having larger dimensions to the form B with smaller dimensions, with the recovery of their initial configuration A by heating the molded IPN mass under humidity, once extracted from the mold 10 (FIG. 3). In particular, the mentioned microparticles 16 are in the form of microspheres preferably having a diameter of 35-55 μm even if, for the applications of the invention, microspheres having a diameter of 10-110 μm can be advantageously used.

As better illustrated in FIG. 4, the initial mass 13 of polymeric mixture is introduced or cast into the mold together with the compressible microparticles, in their initial configuration 16A having a larger volume. Said microparticles are, in particular, homogeneously dispersed inside the mentioned mass 13 of starting polymeric mixture, together with the other components of the same.

Starting from this initial configuration, the mass 13 injected inside the mold 10, in an environment having a constant volume by closing the lid 11, is then subjected to heating, thus creating the gas microcells 20, obtained by decomposition of the chemical blowing agents, and also by means of the gelation and cross-linking reactions of the IPN polymer.

The expansion, thus performed on the mass 13, in contrast with the closing action of the lid 11 on the mold 10 having a constant volume, causes an increase in the pressure which causes the temporary contraction of the above microparticles 16 dispersed inside the initial mass 13 of FIG. 4.

Thanks to the above described contraction phenomenon of the microparticles 16, in response to the increase in pressure 1 in the polymeric mass 13 collected in the mold 10 having a constant volume, these turn from their initial configuration 16A having a larger volume, to that 16B with a reduced volume, the latter referring to the polymer mass 13b (also called "embryo 13b") extracted from the mold 10.

At this point the embryo 13b is heated under humidity conditions (in the presence of water vapor, inside an oven 21, or by immersion in a boiling water bath), until a mass 13c having the desired density of the IPN polymer is obtained, by recovering the initial volume A of the microparticles 16, in combination with the chemical expansion due to the formation of the microcells 20 of blowing gas (FIG. 4).

According to a preferred embodiment, a starting mixture for the production of IPN polymeric foams of the invention, consists of (the percentages are by weight):

| PVC | 35-60% |
|---|---|
| Anhydride | 1-20% |
| Isocyanates | 20-50% |
| Chemical blowing agents | 0.5-7% |
| Surfactant | 0.08-0.8% |
| Catalyst | 0.02-0.2% | wherein 0.05-0.5% of microspheres 16 are added.

As a comparison with the known art, a starting mixture having the following composition:

| PVC | 45% |
|---|---|
| Anhydride | 9% |
| Isocyanates | 45% |
| Surfactant | 0.5% |
| Catalyst | 0.13% | is treated once with only 5.5% of blowing agents (known art of FIG. 2) and a second time with 2.5% of chemical blowing agents, in the presence of 0.2% of microspheres (process of the invention, FIG. 4). In both cases an expanded IPN polymeric foam 13c was obtained, having a density of 45 kg/m$^3$. A process according to the invention consequently allows an expanded material to be obtained (13c of FIG. 4) having the desired density degree, with the use of chemical blowing agents in quantities which are half of those used in current methods (expanded product 13c of FIG. 2), maintaining however unchanged the mechanical properties of the final product, with a more homogeneous distribution of the same inside the mass of the manufactured product.

The invention claimed is:

1. A process for producing expanded PVC, which comprises:
   heating a mass of polymeric mixture inside a closed mold;
   controlling expansion of said mass due to hot molding in an environment having a constant volume defined by the closed mold, said controlling being obtained by a presence, in the mass of polymeric mixture, of microparticles of a compressible material, suitable for being contracted, under action of pressure generated by formation and expansion of microcells of blowing gas in the mass of polymeric mixture, from a first form having a larger volume, to a second form having a smaller volume; and
   expanding the microparticles contained in the mass of polymeric mixture, from the second form to the first form, to produce an expanded material, a density of said expanded material being determined by having at a same time, in the mass of the expanded material, both the microcells of the blowing gas and the microparticles in their first form.

2. The process according to claim 1, wherein the step of expanding the microparticles comprises expanding the microparticles while the polymeric mass is exposed to water vapor or immersed in boiling water.

3. The process according to claim 1, wherein said microparticles are in the form of microspheres, consisting of an outer casing of deformable plastic material, inside which a cavity containing a gas is defined.

4. The process according to claim 3, wherein the outer casing of said microparticles consists of polyacrylonitrile or polymethacrylonitrile, said cavity being filled with isopentane.

5. The process according to claim 3, wherein said microspheres have a diameter of 10-110 μm.

6. The process according to claim 3, wherein said polymeric mixture is a mixture for producing Inter Penetrating Network (IPN) polymeric foams having the following starting composition (w %):

| | |
|---|---|
| PVC | 35-60% |
| Anhydride | 1-20% |
| Isocyanates | 20-50% |
| Blowing agents | 0.5-7% |
| Surfactant | 0.08-0.8% |
| Catalyst | 0.02-0.2% | in the presence of 0.05-0.5% of the microspheres.

7. An expanded plastic material based on PVC, the expanded plastic material being manufactured by the process of claim 1.

8. A product made of expanded PVC, wherein the product is produced using the expanded plastic material of claim 7.

9. The product according to claim 8, wherein said expanded plastic material consists of Inter Penetrating Network (IPN) polymeric foams, containing said microparticles in their first form having a larger volume.

* * * * *